United States Patent
Endou

(10) Patent No.: US 6,571,098 B1
(45) Date of Patent: May 27, 2003

(54) SYSTEM, DEVICE AND METHOD FOR MOBILE RADIO COMMUNICATION EMPLOYING SELECTION PROCESS CAPABLE OF DECREASING DATA BUFFERING DELAY

(75) Inventor: Hiroya Endou, Tokyo (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 09/610,771

(22) Filed: Jul. 6, 2000

(30) Foreign Application Priority Data

Jul. 9, 1999 (JP) .......................................... 11-195330

(51) Int. Cl.[7] ................................................ H04Q 7/20
(52) U.S. Cl. ........................ 455/436; 455/440; 370/320; 370/321
(58) Field of Search ............................. 455/436, 438, 455/439, 440, 442, 444; 370/321, 320

(56) References Cited

U.S. PATENT DOCUMENTS

| | | | |
|---|---|---|---|
| 5,854,981 A | * | 12/1998 | Wallstedt et al. |
| 6,038,458 A | * | 3/2000 | Siira |
| 6,101,400 A | * | 8/2000 | Ogaz et al. |
| 6,128,287 A | * | 10/2000 | Freeburg et al. |

FOREIGN PATENT DOCUMENTS

| | | |
|---|---|---|
| JP | 8-186857 | 7/1996 |
| JP | 10-13922 | 1/1998 |

* cited by examiner

*Primary Examiner*—Thanh Cong Le
*Assistant Examiner*—Huy D Nguyen
(74) *Attorney, Agent, or Firm*—Dickstein, Shapiro, Morin & Oshinsky, LLP.

(57) ABSTRACT

In a mobile radio communication system including mobile stations; radio base stations which communicate with the mobile stations via connections on radio waves; base station controllers for controlling radio base stations thereunder; and mobile services switch centers, an upstream selection process section, which is provided to the base station controller for executing a selection process, operates in two operation modes ("normal mode" and "through mode") with respect to each mobile station. In the case where the operation mode of the upstream selection process section with respect to a mobile station is the "through mode" (that is, when a "communicating connection number" with respect to the mobile station is 1), the upstream selection process section which received upstream data transmitted by the mobile station from a radio base station thereunder or from another lower base station controller directly transmits the received upstream data to the next upper device, without executing the selection process. By the "through mode", wait delay for the selection process in inter-BSC (Base Station Controller) handover can be minimized.

11 Claims, 3 Drawing Sheets

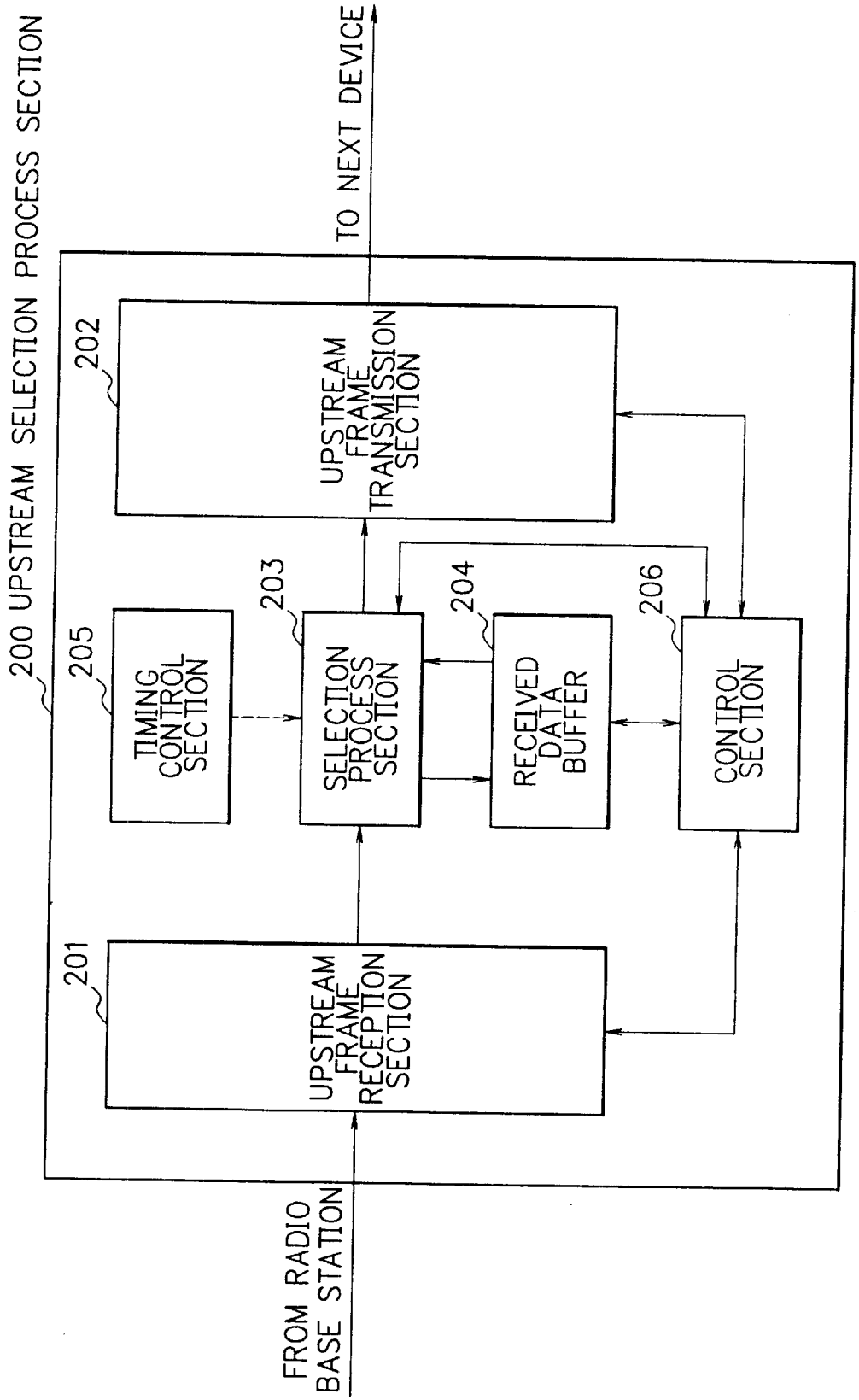

SYSTEM, DEVICE AND METHOD FOR MOBILE RADIO COMMUNICATION EMPLOYING SELECTION PROCESS CAPABLE OF DECREASING DATA BUFFERING DELAY

BACKGROUND OF THE INVENTION

The present invention relates to a device and a method for mobile radio communication, and in particular, to a mobile radio communication system, a mobile radio communication method and a base station controller employing data selection process.

DESCRIPTION OF THE PRIOR ART

Mobile stations such as portable cellular phones have become widely available these days, and mobile stations according to CDMA (Code Division Multiple Access) have been popular today because of their fine speech quality.

FIG. 1 shows an example of a CDMA mobile radio communication system. The mobile communication system shown in FIG. 1 includes a mobile station (MS) 101, radio base stations (BS's) 102A, 102B, 102C and 102D, base station controllers (BSCs) 104 and 105, and a mobile services switch center (MSC) 108. The radio base stations 102A, 102B, 102C and 102D take charge of mobile service areas 103A, 103B, 103C and 103D, respectively. The radio base stations 102A and 102B are connected to the base station controller 104, and the radio base stations 102C and 102D are connected to the base station controller 105.

In the CDMA mobile radio communication system of FIG. 1, upstream data which is transmitted by the mobile station 101 which is located in the mobile service areas 103A and 103B is received by the radio base stations 102A and 102B, and the radio base stations 102A and 102B send the received data to the base station controller 104. The base station controller 104 which receives the upstream data of the mobile station 101 from the radio base stations 102A and 102B executes "selection process for diversity hand-over" with regard to the received upstream data, according to timing which is provided in sync with radio frames. In the selection process, the base station controller 104 selects the upstream data from the radio base station 102A or the upstream data from the radio base station 102B based on radio quality information which is supplied from the radio base stations 102A and 102B. After the selection process is finished, the base station controller 104 sends the selected upstream data to the mobile services switch center 108.

However, if there is a difference of data transmission time between the line from the radio base station 102A to the base station controller 104 and the line from the radio base station 102B to the base station controller 104 (for example, if the data transmission from the radio base stations 102A and 102B to the base station controller 104 is executed by means of ATM (Asynchronous Transfer Mode) data transmission and variations in cell delay occur), the base station controller 104 has to execute the selection process after waiting for the slowest upstream data corresponding to the longest data transmission time. While the base station controller 104 waits for the slowest upstream data, faster upstream data have to be temporarily stored in a buffer of the base station controller 104, thereby processing delay due to the data buffering occurs.

Further, when the mobile station 101, which has been located in the mobile service areas 103A and 103B and executing communication with the radio base stations 102A and 102B under the base station controller 104 (anchor-side base station controller (that is, a base station controller which started the communication with the mobile station 101 first)), moves into other mobile service areas 103C and 103D and starts communication with other radio base stations 102C and 102D under another base station controller 105 (drift-side base station controller) as shown in FIG. 1, a large number of connections become necessary if connections are established from the anchor-side base station controller 104 to all the radio base stations 102C and 102D which are communicating with the mobile station 101 under the drift-side base station controller 105. Therefore, in such cases, the selection process is executed first in the drift-side base station controller 105 and only the selected upstream data is sent to the anchor-side base station controller 104, and thereafter the selection process is executed again in the anchor-side base station controller 104.

However, in the above method employing two stages of selection processes at the drift-side base station controller 105 and the anchor-side base station controller 104, much data buffering time occurs in the drift-side base station controller 105 and the anchor-side base station controller 104, and thereby delay is caused in the mobile radio communication service.

SUMMARY OF THE INVENTION

It is therefore the primary object of the present invention to provide a mobile radio communication system, a mobile radio communication method and a base station controller employing the selection process for diversity hand-over, by which the wait delay for the selection process in the case of the inter-BSC (Base Station Controller) handover can be decreased and thereby the processing delay can be minimized.

In accordance with a first aspect of the present invention, there is provided a mobile radio communication system comprising: mobile stations; radio base stations which communicate with the mobile stations via connections on radio waves; base station controllers for controlling radio base stations thereunder, each of which including an upstream selection process section for executing a selection process, in which received upstream data which have been transmitted by a mobile station and supplied from radio base stations thereunder to the base station controller are temporarily stored in a buffer and data having the highest quality is selected from the stored upstream data corresponding to the same radio frame based on radio quality information and the selected data having the highest quality is sent to the next upper device; and mobile services switch centers each of which is provided as the interface between a network and base station controllers which are connected thereunder. In the mobile radio communication system, the operation mode of the upstream selection process section of the base station controller can be set to through mode with respect to a mobile station. When the operation mode of an upstream selection process section of a base station controller is the through mode with respect to a mobile station and the upstream selection process section received upstream data transmitted by the mobile station from a radio base station thereunder or a lower base station controller which is communicating with the base station controller, the upstream selection process section directly sends the received upstream data to the next upper device without temporarily storing the received upstream data and executing the selection process.

In accordance with a second aspect of the present invention, in the first aspect, the operation mode of the upstream selection process section of the base station controller is set to normal mode with respect to a mobile station and thereby the selection process is executed normally with respect to the mobile station when a communicating connection number with respect to the mobile station, which means the number of radio base stations and lower base station controllers which are communicating with the base station controller with respect to the mobile station, is 2 or more. The operation mode of the upstream selection process section is set to the through mode with respect a mobile station when the communicating connection number with respect to the mobile station is 1.

In accordance with a third aspect of the present invention, in the first aspect, when a mobile station, which has been executing communication in a mobile service area of a radio base station under a first base station controller, moved and started communication with another radio base station under a second base station controller, the operation mode of the upstream selection process section of the second base station controller is set to the through mode with respect to the mobile station.

In accordance with a fourth aspect of the present invention, in the first aspect, when a mobile station, which has been executing communication in a mobile service area of a radio base station under a first base station controller, moved and started communication with another radio base station under a second base station controller and thereby the first base station controller finishes the communication with the radio base station thereunder and thereafter executes communication with the another radio base station under the second base station controller, the operation mode of the upstream selection process section of the first base station controller is set to the through mode with respect to the mobile station.

In accordance with a fifth aspect of the present invention, in the first aspect, the communication between the mobile station and the radio base stations is executed by means of CDMA (Code Division Multiple Access).

In accordance with a sixth aspect of the present invention, there is provided a base station controller for controlling radio base stations thereunder which communicate with mobile stations via connections on radio waves. The base station controller includes an upstream selection process section which includes an upstream data reception means, a timing control means, a selection process means, an upstream frame transmission means and a control means. The upstream data reception means receives upstream data which have been transmitted by a mobile station, received by one or more radio base stations and supplied from the radio base stations or another lower base station controller to the base station controller. The timing control means provides processing timing for selection process to the selection process means. The selection process means is provided with functions for operating depending on whether the present operation mode with respect to a mobile station is normal mode or through mode when the upstream data reception means received upstream data transmitted by the mobile station, storing/reading upstream data to/from a received data buffer and executing the selection process for upstream data according to the processing timing which is provided by the timing control means. The upstream frame transmission means transmits the upstream data outputted by the selection process means to the next upper device. The control means controls the operations of the upstream frame reception means, the upstream frame transmission means, the selection process means and the received data buffer. When a communicating connection number with respect to a mobile station, which means the number of radio base stations and lower base station controllers which are communicating with the base station controller with respect to the mobile station, is 2 or more, the operation mode of the upstream selection process section of the base station controller is set to normal mode with respect to the mobile station and thereby the selection process is executed by the selection process means normally with respect to the mobile station. When the communicating connection number with respect to a mobile station is 1, the operation mode of the upstream selection process section is set to the through mode with respect the mobile station and thereby the received upstream data is directly transmitted to the next upper device without temporarily storing the received upstream data in the received data buffer and executing the selection process.

In accordance with a seventh aspect of the present invention, there is provided a mobile radio communication method for a mobile radio communication system which is provided with: mobile stations; radio base stations which communicate with the mobile stations via connections on radio waves; base station controllers for controlling radio base stations thereunder, each of which including an upstream selection process section for executing a selection process, in which received upstream data which have been transmitted by a mobile station and supplied from radio base stations thereunder to the base station controller are temporarily stored in a buffer and data having the highest quality is selected from the stored upstream data corresponding to the same radio frame based on radio quality information and the selected data having the highest quality is sent to the next upper device; and mobile services switch centers each of which is provided as the interface between a network and base station controllers which are connected thereunder. In the mobile radio communication method, the operation mode of the upstream selection process section of the base station controller is set to through mode with respect to a mobile station when necessary. When the operation mode of an upstream selection process section of a base station controller is the through mode with respect to a mobile station and the upstream selection process section received upstream data transmitted by the mobile station from a radio base station thereunder or a lower base station controller which is communicating with the base station controller, the upstream data received by the upstream selection process section is directly sent to the next upper device without temporarily storing the received upstream data and executing the selection process.

In accordance with an eighth aspect of the present invention, in the seventh aspect, the operation mode of the upstream selection process section of the base station controller is set to normal mode with respect to a mobile station and thereby the selection process is executed normally with respect to the mobile station when a communicating connection number with respect to the mobile station, which means the number of radio base stations and lower base station controllers which are communicating with the base station controller with respect to the mobile station, is 2 or more. The operation mode of the upstream selection process section is set to the through mode with respect a mobile station when the communicating connection number with respect to the mobile station is 1.

In accordance with a ninth aspect of the present invention, in the seventh aspect, when a mobile station, which has been executing communication in a mobile service area of a radio base station under a first base station controller, moved and started communication with another radio base station under a second base station controller, the operation mode of the upstream selection process section of the second base station controller is set to the through mode with respect to the mobile station.

In accordance with a tenth aspect of the present invention, in the seventh aspect, when a mobile station, which has been executing communication in a mobile service area of a radio base station under a first base station controller, moved and started communication with another radio base station under a second base station controller and thereby the first base station controller finishes the communication with the radio base station thereunder and thereafter executes communication with the another radio base station under the second base station controller, the operation mode of the upstream selection process section of the first base station controller is set to the through mode with respect to the mobile station.

In accordance with an eleventh aspect of the present invention, in the seventh aspect, the communication between the mobile station and the radio base stations is executed by means of CDMA (Code Division Multiple Access).

BRIEF DESCRIPTION OF THE DRAWINGS

The objects and features of the present invention will become more apparent from the consideration of the following detailed description taken in conjunction with the accompanying drawings, in which:

FIG. 2 is a block diagram showing an example of the composition of an upstream selection process section of a base station controller which is shown in FIG. 1.

DESCRIPTION OF THE PREFERRED EMBODIMENTS

Figure 1:
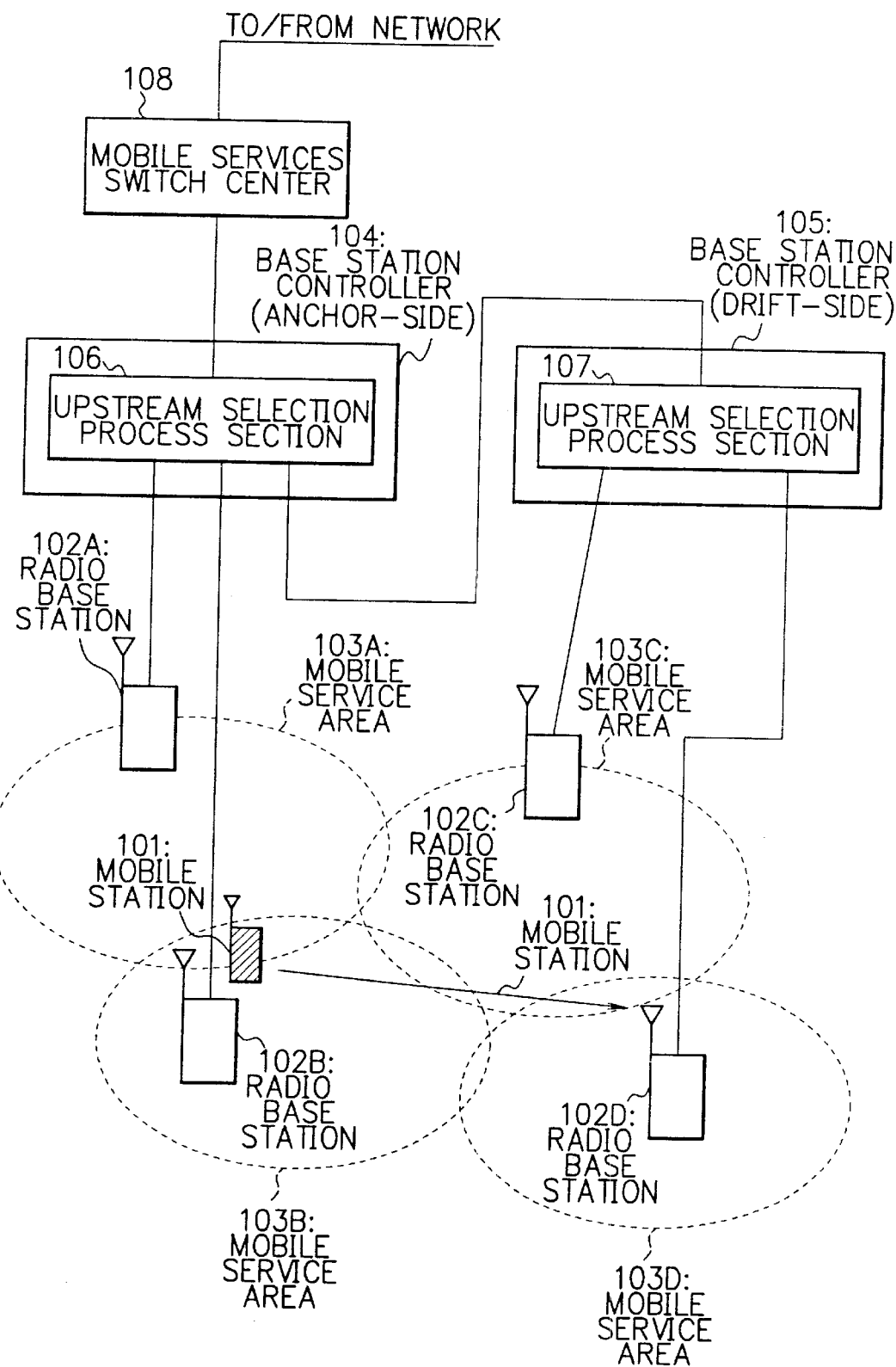
FIG. 1 is a schematic block diagram for explaining a mobile radio communication system in accordance with an embodiment of the present invention.

Referring now to the drawings, a description will be given in detail of a preferred embodiment in accordance with the present invention.

FIG. 1 is a schematic block diagram for explaining a mobile radio communication system in accordance with an embodiment of the present invention. The mobile communication system shown in FIG. 1 includes a mobile station (MS) 101, radio base stations (BS's) 102A, 102B, 102C and 102D, base station controllers (BSCs) 104 and 105, and a mobile services switch center (MSC) 108.

The radio base stations 102A, 102B, 102C and 102D take charge of mobile service areas 103A, 103B, 103C and 103D, respectively. The mobile station 101 shown in FIG. 1, which is executing mobile radio communication in the mobile service areas 103A and 103B of the radio base stations 102A and 102B, is moving toward the mobile service areas 103C and 103D of the radio base stations 102C and 102D.

The radio base stations 102A and 102B are connected to the base station controller 104, and the radio base stations 102C and 102D are connected to the base station controller 105.

The base station controller 104 (anchor-side base station controller) includes an upstream selection process section 106. The upstream selection process section 106 executes selection from data which have been received by the radio base stations 102A and 102B from the mobile station 101 and which have been supplied from the radio base stations 102A and 102B to the base station controller 104, and sends the selected data to the mobile switching exchange 108.

The base station controller 105 (drift-side base station controller) includes an upstream selection process section 107. When the mobile station 101 has moved into the mobile service areas 103C and 103D, the upstream selection process section 107 executes selection from data which have been received by the radio base stations 102C and 102D from the mobile station 101 and which have been supplied from the radio base stations 102C and 102D to the base station controller 105, and sends the selected data to the base station controller 104 (anchor-side base station controller).

The mobile switching exchange 108 executes data communication with a network (PSTN (Public Switched Telephone Network), ISDN (Integrated Services Digital Network), etc.).

FIG. 2 is a block diagram showing an example of the composition of the upstream selection process section 106 of the base station controller 104. Incidentally, the upstream selection process section 107 of the base station controller 105 also has the same composition. In FIG. 2, the upstream selection process section (106, 107) is shown as an upstream selection process section 200.

Referring to FIG. 2, the upstream selection process section 200 (106, 107) includes an upstream frame reception section 201, an upstream frame transmission section 202, a selection process section 203, a received data buffer 204, a timing control section 205, and a control section 206.

The upstream frame reception section 201 receives upstream data from radio base stations which are connected thereto, and sends the upstream data to the selection process section 203.

The control section 206 controls the operations of the upstream frame reception section 201, the upstream frame transmission section 202, the selection process section 203 and the received data buffer 204.

The timing control section 205 provides processing timing to the selection process section 203.

The selection process section 203 is provided with functions for storing information concerning an "operation mode" with respect to each mobile station 101 (in communication with the upstream selection process section 200) which is set by the control section 206, operating according to the operation mode, storing/reading upstream data to/from the received data buffer 204, executing selection process for upstream data according to the processing timing which is provided by the timing control section 205, and sending the selected upstream data to the upstream frame transmission section 202. When the operation mode of the selection process section 203 with respect to a mobile station 101 is "through mode" which will be explained later, the selection process section 203 does not execute the selection process with respect to the mobile station 101 and directly sends the upstream data from the mobile station 101 to the upstream frame transmission section 202.

The upstream frame transmission section 202 receives the upstream data which have been selected by the selection process section 203 and transmits the selected upstream data to the next device (a mobile services switch center or a base station controller depending on whether the upstream selection process section 200 is anchor-side or drift-side). In the "through mode" which will be explained below, the upstream frame transmission section 202 receives the upstream data which have been directly outputted by the selection process section 203 without executing the selection process and transmits the upstream data to the next device.

Figure 3A:
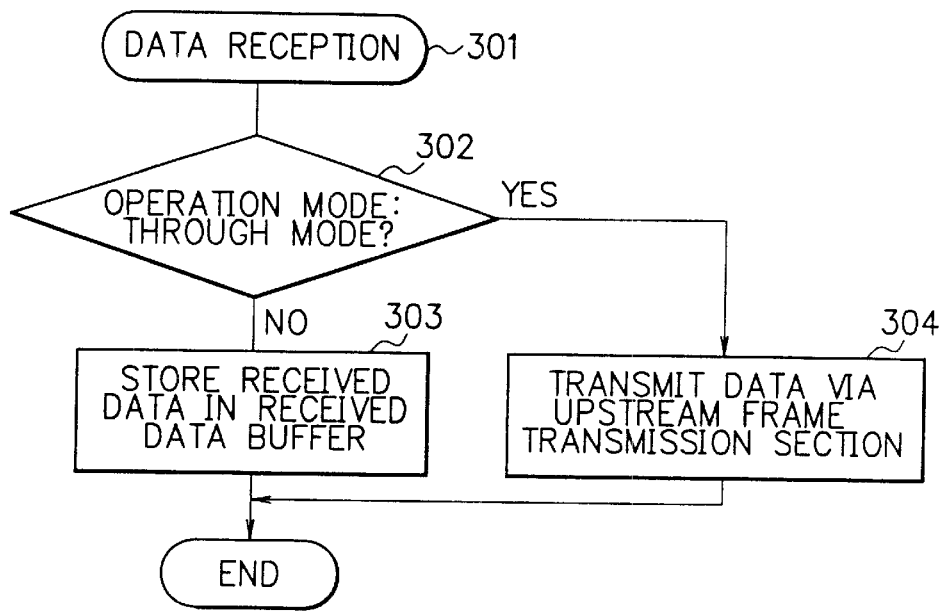
FIGS. 3A and 3B are flow charts showing the operation of a selection process section of the upstream selection process section of FIG. 2.
Figure 3B:
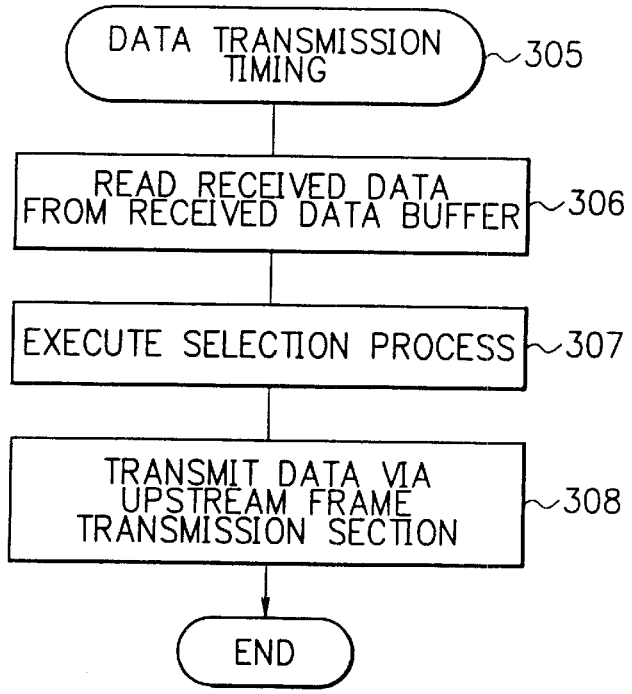

FIGS. 3A and 3B are flow charts showing the operation of the selection process section 203 of the upstream selection process section 200 (106, 107) in accordance with the embodiment of the present invention. The operation of the selection process section 203 when the upstream selection process section 200 received data will be explained referring to FIGS. 3A and 3B.

The control section 206 of the upstream selection process section 200 of a base station controller constantly recognizes the number of radio base stations and lower base station controllers which are communicating with the base station controller, with respect to each mobile station 101 in communication with the upstream selection process section 200. The number will hereafter be referred to as a "communicating connection number (with respect to a mobile station 101)". The control section 206 sets the operation mode of the selection process section 203 with respect to a mobile station 101 to "normal mode" when the communicating connection number with respect to the mobile station 101 is two or more, and to "through mode" when the communicating connection number with respect to the mobile station 101 is one.

When the selection process section 203 received upstream data which have been transmitted by a mobile station 101 (step 301), the selection process section 203 judges whether the operation mode of the selection process section 203 with respect to the mobile station 101 which has been set by the control section 206 is the through mode or not (i.e. the normal mode) (step 302). If the operation mode with respect to the mobile station 101 is the normal mode ("No" in the step 302), the selection process section 203 stores the received upstream data from the mobile station 101 in the received data buffer 204. If the operation mode with respect to the mobile station 101 is the through mode ("Yes" in the step 302), the selection process section 203 directly transmits the received upstream data to the next device (that is, to the mobile switching exchange 108 (in the case where the upstream selection process section 200 is the upstream selection process section 106 (anchor-side)), or to the anchor-side base station controller 104 (in the case where the upstream selection process section 200 is the upstream selection process section 107 (drift-side))) via the upstream frame transmission section 202, without storing the upstream data in the received data buffer 204 (step 304).

As explained above, the received upstream data is stored in the received data buffer 204 in the normal mode. Next, the upstream data transmission from the received data buffer 204 to the next device (the mobile switching exchange 108 or the anchor-side base station controller 104) will be explained.

According to the processing timing for the selection process which is provided by the timing control section 205 (when upstream data transmission timing has come) (step 305), the selection process section 203 reads out appropriate upstream data (that is, data corresponding to the same radio frame from the mobile station 101 which have been supplied from the radio base stations under the base station controller) from the received data buffer 204 (step 306), executes the selection process (step 307), and transmits the selected upstream data to the next device (that is, to the mobile switching exchange 108 (in the case where the upstream selection process section 200 is the upstream selection process section 106 on the anchor-side), or to the anchor-side base station controller 104 (in the case where the upstream selection process section 200 is the upstream selection process section 107 on the drift-side)) via the upstream frame transmission section 202 (step 308).

Referring again to FIG. 1, when the mobile station 101, which has been located in the mobile service area 103A of the radio base station 102A under the base station controller 104, moved into another mobile service area 103C and started communication with the radio base station 102C under the base station controller 105, the communicating connection number of the upstream selection process section 107 of the base station controller 105 becomes 1 with respect to the mobile station 101, and thereby the operation mode of the selection process section 203 with respect to the mobile station 101 is set to the through mode in the upstream selection process section 107 of the base station controller 105. By the setting to the through mode, the time for buffering the upstream data from the mobile station 101 in the received data buffer 204 of the upstream selection process section 107 becomes unnecessary, and thereby the processing delay due to the data buffering is eliminated.

When the moving mobile station 101 finishes communication with the radio base stations 102A and 102B under the base station controller 104 and starts communication with the radio base stations 102C and 102D under the base station controller 105 only, the communicating connection number of the upstream selection process section 106 of the base station controller 104 becomes 1 with respect to the mobile station 101 (the connection with the base station controller 105 only, with respect to the mobile station 101) and thus the operation mode with respect to the mobile station 101 is set to the through mode in the upstream selection process section 106, thereby the processing delay at the base station controller 104 is shortened.

As described above, in the mobile radio communication system in accordance with the embodiment of the present invention, the wait delay for the selection process of the base station controller (104, 105) can be minimized, since the operation mode of the selection process section 203 of the base station controller with respect to a mobile station 101 can be set to the through mode when the communicating connection number with respect to the mobile station 101 is 1 and thereby the time for buffering the upstream data in the received data buffer 204 of the base station controller can be eliminated.

For example, first, when the mobile station 101 moved out of a mobile service area of a radio base station under the anchor-side base station controller (104) and started communication with another base station under a drift-side base station controller (105), the operation mode of the selection process section 203 of the upstream selection process section 200 of the drift-side base station controller (105) is set to the through mode with respect to the mobile station 101 since the communicating connection number with respect to the mobile station 101 becomes (from 0) to 1, thereby the data buffering time at the drift-side base station controller (105) does not occur at this stage, and thereby the processing delay at the drift-side base station controller is shortened.

Second, when the mobile station 101 moved out of a mobile service area (103A) of a radio base station (102A) under the anchor-side base station controller (104) and started communication with another radio base station (102C) under a drift-side base station controller (105) and thereby the anchor-side base station controller (104) finishes the communication with the radio base station (102A) thereunder and thereafter executes communication with the another radio base station (102C) under the drift-side base station controller (105), the communicating connection number of the upstream selection process section 200 of the anchor-side base station controller (104) with respect to the mobile station 101 becomes 1 (connection with the drift-side base station controller (105) only) and thus the operation mode of the selection process section 203 of the anchor-side base station controller (104) is set to the through mode, thereby the processing delay at the anchor-side base station controller (104) can be shortened.

While the present invention has been described with reference to the particular illustrative embodiments, it is not to be restricted by those embodiments but only by the appended claims. For example, the mobile radio communication system is not limited to CDMA mobile radio communication system. The present invention can also be applied to other types of mobile radio communication systems which employ the selection process requiring the data buffering. It is to be appreciated that those skilled in the art can change or modify the embodiments without departing from the scope and spirit of the present invention.

What is claimed is:

1. A mobile radio communication system comprising:

mobile stations;

radio base stations which communicate with the mobile stations via connections on radio waves;

base station controllers for controlling radio base stations thereunder, each of which including an upstream selection process section for executing a selection process, in which received upstream data which have been transmitted by a mobile station and supplied from radio base stations thereunder to the base station controller are temporarily stored in a buffer and data having the highest quality is selected from the stored upstream data corresponding to the same radio frame based on radio quality information and the selected data having the highest quality is sent to the next upper device; and mobile services switch centers each of which is provided as the interface between a network and base station controllers which are connected thereunder, wherein:

the operation mode of the upstream selection process section of the base station controller can be set to through mode with respect to a mobile station, and when the operation mode of an upstream selection process section of a base station controller is the through mode with respect to a mobile station and the upstream selection process section received upstream data transmitted by the mobile station from a radio base station thereunder or a lower base station controller which is communicating with the base station controller, the upstream selection process section directly sends the received upstream data to the next upper device without temporarily storing the received upstream data and executing the selection process.

2. A mobile radio communication system as claimed in claim 1, wherein:

the operation mode of the upstream selection process section of the base station controller is set to normal mode with respect to a mobile station and thereby the selection process is executed normally with respect to the mobile station when a communicating connection number with respect to the mobile station, which means the number of radio base stations and lower base station controllers which are communicating with the base station controller with respect to the mobile station, is 2 or more, and the operation mode of the upstream selection process section is set to the through mode with respect a mobile station when the communicating connection number with respect to the mobile station is 1.

3. A mobile radio communication system as claimed in claim 1, wherein:

when a mobile station, which has been executing communication in a mobile service area of a radio base station under a first base station controller, moved and started communication with another radio base station under a second base station controller, the operation mode of the upstream selection process section of the second base station controller is set to the through mode with respect to the mobile station.

4. A mobile radio communication system as claimed in claim 1, wherein:

when a mobile station, which has been executing communication in a mobile service area of a radio base station under a first base station controller, moved and started communication with another radio base station under a second base station controller and thereby the first base station controller finishes the communication with the radio base station thereunder and thereafter executes communication with the another radio base station under the second base station controller, the operation mode of the upstream selection process section of the first base station controller is set to the through mode with respect to the mobile station.

5. A mobile radio communication system as claimed in claim 1, wherein the communication between the mobile station and the radio base stations is executed by means of CDMA (Code Division Multiple Access).

6. A base station controller for controlling radio base stations thereunder which communicate with mobile stations via connections on radio waves, wherein:

the base station controller includes an upstream selection process section which includes:

an upstream data reception means for receiving upstream data which have been transmitted by a mobile station, received by one or more radio base stations and supplied from the radio base stations or another lower base station controller to the base station controller;

a timing control means for providing processing timing for selection process;

a selection process means which is provided with functions for operating depending on whether the present operation mode with respect to a mobile station is normal mode or through mode when the upstream data reception means received upstream data transmitted by the mobile station, storing/reading upstream data to/from a received data buffer and executing the selection process for upstream data according to the processing timing which is provided by the timing control means;

an upstream frame transmission means for transmitting the upstream data outputted by the selection process means to the next upper device; and a control means for controlling the operations of the upstream frame reception means, the upstream frame transmission means, the selection process means and the received data buffer, and when a communicating connection number with respect to a mobile station, which means the number of radio base stations and lower base station controllers which are communicating with the base station controller with respect to the mobile station, is 2 or more, the operation mode of the upstream selection process section of the base station controller is set to normal mode with respect to the mobile station and thereby the selection process is executed by the selection process means normally with respect to the mobile station, and when the communicating connection number with respect to a mobile station is 1, the operation mode of the upstream selection process section is set to the through mode with respect to the mobile station and thereby the received upstream data is directly transmitted to the next upper device without temporarily storing the received upstream data in the received data buffer and executing the selection process.

7. A mobile radio communication method for a mobile radio communication system which is provided with:

mobile stations;

radio base stations which communicate with the mobile stations via connections on radio waves;

base station controllers for controlling radio base stations thereunder, each of which including an upstream selection process section for executing a selection process, in which received upstream data which have been transmitted by a mobile station and supplied from radio base stations thereunder to the base station controller are temporarily stored in a buffer and data having the highest quality is selected from the stored upstream data corresponding to the same radio frame based on radio quality information and the selected data having the highest quality is sent to the next upper device; and mobile services switch centers each of which is provided as the interface between a network and base station controllers which are connected thereunder, wherein:

the operation mode of the upstream selection process section of the base station controller is set to through mode with respect to a mobile station when necessary, and when the operation mode of an upstream selection process section of a base station controller is the through mode with respect to a mobile station and the upstream selection process section received upstream data transmitted by the mobile station from a radio base station thereunder or a lower base station controller which is communicating with the base station controller, the upstream data received by the upstream selection process section is directly sent to the next upper device without temporarily storing the received upstream data and executing the selection process.

8. A mobile radio communication method as claimed in claim 7, wherein:

the operation mode of the upstream selection process section of the base station controller is set to normal mode with respect to a mobile station and thereby the selection process is executed normally with respect to the mobile station when a communicating connection number with respect to the mobile station, which means the number of radio base stations and lower base station controllers which are communicating with the base station controller with respect to the mobile station, is 2 or more, and the operation mode of the upstream selection process section is set to the through mode with respect a mobile station when the communicating connection number with respect to the mobile station is 1.

9. A mobile radio communication method as claimed in claim 7, wherein:

when a mobile station, which has been executing communication in a mobile service area of a radio base station under a first base station controller, moved and started communication with another radio base station under a second base station controller, the operation mode of the upstream selection process section of the second base station controller is set to the through mode with respect to the mobile station.

10. A mobile radio communication method as claimed in claim 7, wherein:

when a mobile station, which has been executing communication in a mobile service area of a radio base station under a first base station controller, moved and started communication with another radio base station under a second base station controller and thereby the first base station controller finishes the communication with the radio base station thereunder and thereafter executes communication with the another radio base station under the second base station controller, the operation mode of the upstream selection process section of the first base station controller is set to the through mode with respect to the mobile station.

11. A mobile radio communication method as claimed in claim 7, wherein the communication between the mobile station and the radio base stations is executed by means of CDMA (Code Division Multiple Access).

* * * * *